(12) United States Patent
Tahat

(10) Patent No.: US 7,385,617 B2
(45) Date of Patent: Jun. 10, 2008

(54) METHODS FOR MULTI-USER BROADBAND WIRELESS CHANNEL ESTIMATION

(75) Inventor: Ashraf A. Tahat, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 720 days.

(21) Appl. No.: 10/431,005

(22) Filed: May 7, 2003

(65) Prior Publication Data

US 2004/0223561 A1  Nov. 11, 2004

(51) Int. Cl.
*H04B 1/69* (2006.01)
(52) U.S. Cl. .................................... 347/147
(58) Field of Classification Search ............. 375/141, 375/146, 177, 296, 347
See application file for complete search history.

(56) References Cited

U.S. PATENT DOCUMENTS

| | | | |
|---|---|---|---|
| 5,414,734 A | 5/1995 | Marchetto et al. | |
| 5,724,378 A | 3/1998 | Miki et al. | |
| 5,802,117 A | 9/1998 | Ghosh | |
| 5,901,185 A | 5/1999 | Hassan | |
| 5,905,946 A | 5/1999 | Lilleberg et al. | |
| 5,912,931 A | 6/1999 | Matsumoto et al. | |
| 5,982,327 A | 11/1999 | Vook et al. | |
| 6,097,711 A | 8/2000 | Okawa et al. | |
| 6,141,393 A | 10/2000 | Thomas et al. | |
| 6,154,443 A * | 11/2000 | Huang et al. ............... | 375/130 |
| 6,173,011 B1 | 1/2001 | Rey et al. | |
| 6,178,194 B1 | 1/2001 | Vasic | |
| 6,269,131 B1 | 7/2001 | Gothe et al. | |
| 6,301,237 B1 | 10/2001 | Miya | |
| 6,314,131 B1 | 11/2001 | Roe et al. | |

(Continued)

FOREIGN PATENT DOCUMENTS

EP  954 143  11/1999

(Continued)

OTHER PUBLICATIONS

Tahat et al. "A CID Approach to Multi-user Channel Estimation for OFDM in SDMA," in Proceedings of the Wireless and Optical Communications Conference, Jul. 17-Jul. 19, 2002, Banff, Alberta, Canada, pp. 27-31.*

(Continued)

*Primary Examiner*—Khai Tran
(74) *Attorney, Agent, or Firm*—Pauley Petersen & Erickson

(57) ABSTRACT

A system and method of channel estimation for a multi-user broadband wireless channel estimation in multiple antenna receiver systems use a specifically selected delay in the pilot symbol sequence portion of the transmission which is a multiple of the minimum Cyclic Prefix delay length. This insures that the time-frequency slot information bursts will always be separated in the time domain. A matched filter output in the receiver is formed by multiplying each pilot symbol by the conjugate of the training symbols of the first user. Estimation of the channel response may include three different versions of the efficient estimation calculations, namely Constrained Inverse Deconvolution, Iterative Low Complexity, and Extrapolated Matched Filter estimations. The first two methods do not require matrix multiplication (using only Fourier transforms), while the third method utilizes a smaller matrix multiplication than previously taught. Hardware considerations are also reduced due to the lack of a need for extensive matrix by matrix calculations.

22 Claims, 6 Drawing Sheets

U.S. PATENT DOCUMENTS

| | | | |
|---|---|---|---|
| 6,317,612 | B1 | 11/2001 | Farsakh |
| 6,339,612 | B1 | 1/2002 | Stewart et al. |
| 6,369,757 | B1 | 4/2002 | Song et al. |
| 6,370,129 | B1 | 4/2002 | Huang |
| 6,377,607 | B1 | 4/2002 | Ling et al. |
| 6,389,079 | B2 | 5/2002 | Raheli et al. |
| 6,411,649 | B1 | 6/2002 | Arslan et al. |
| 6,445,342 | B1 | 9/2002 | Thomas et al. |
| 6,473,467 | B1 | 10/2002 | Wallace et al. |
| 6,477,210 | B2 | 11/2002 | Chuang et al. |
| 6,493,330 | B1 | 12/2002 | Miya et al. |
| 7,099,409 | B2* | 8/2006 | Yousef ................. 375/340 |
| 2001/0046882 | A1* | 11/2001 | Karimi et al. ............. 455/561 |
| 2002/0094049 | A1* | 7/2002 | Aslanis et al. ............ 375/365 |
| 2002/0181617 | A1* | 12/2002 | Carleton ................... 375/316 |
| 2003/0235238 | A1* | 12/2003 | Schelm et al. ............ 375/148 |

FOREIGN PATENT DOCUMENTS

| | | |
|---|---|---|
| WO | 00/52872 | 9/2000 |
| WO | 02/45329 | 6/2002 |
| WO | 02/093860 | 11/2002 |

OTHER PUBLICATIONS

Tahat et al. "An Iterative Low Complexity Multi-user Channel Estimation for SDMA," in Proceedings of the International Conference on Broadband Wireless Access Systems, May 28-May 31, 2002, San Francisco, CA, pp. 701-706.*

Tahat et al. "An Extrapolated Matched filter Approach to Multi-user Channel Estimation in OFDM," in Proceedings of the IEEE Antennas and Propagation International Symposium, Jun. 21, 2002, San Antonio, TX, pp. 636-639.*

Tahat "Multi-user Channel Estimation Techniques for SDMA," Copyright Publication, May 2002, pp. 1-102.*

Ashraf Akram Tahat: Multi-User OFDM Channel Estimation Techniques for SDMA, *Copyright Publication*, pp. 1-102, May 2002.

F. Vook et al.: Least Squares Multi-User Frequency-Domain Channel Estimation for Broadband Wireless Communications System, *Proc. 37th Allerton Conference*, pp. 1-10, Sep. 1999.

F. Vook et al.: Adaptive Antennas for OFDM, *Proc. Vehicular Technology Conference*, pp. 606-610, May 1998.

C.A. Baird et al.: Performance Criteria for Narrowband Array Processing, *Proc. IEEE Conference on Decision Control*, p. 565, Dec. 1971.

A. Tahat et al.: A CID Approach to Multi-User Channel Estimation for OFDM in SDMA, *Proceedings of the Wireless and Optical Communications Conference*, pp. 27-31, Jul. 19, 2002.

A. Tahat et al.: An extrapolated Matched-Filter Approach to Multi-User Channel Estimation for OFDM in SDMA, *Proceedings of the IEEE Antennas and Propagation Intl. Symposium*, pp. 636-639, Jun. 21, 2002.

A. Tahat et al.: An Iterative Low Complexity Multi-User Channel Estimation Technique for OFDM in SDMA, *Proceedings of the Intl. Conference on Broadband Wireless Access Systems*, pp. 701-706, May 31, 2002.

B. Johnson et al.: The Use of Iterative Deconvolution for Scattering Function Identification, *The Journal of the Acoustical Society of America*, pp. 2790-2798, May 1992.

M.S. Sabri et al.: An Approach to Band-Limited Signal Extrapolation: The Extrapolation Matrix, *IEEE Transactions on Circuits and Systems*, pp. 74-78, vol. CAS-25, Feb. 1978.

* cited by examiner

METHODS FOR MULTI-USER BROADBAND WIRELESS CHANNEL ESTIMATION

BACKGROUND OF THE INVENTION

The demand for wireless, or mobile, communications is growing exponentially while, simultaneously, there is a continuous growth in video, voice, and data communication over the Internet. In addition, multimedia and computer communications are becoming an integral part of today's businesses and industry. Therefore, it is desirable that Internet/Multimedia communications, e.g. digital based communications, be merged into the wireless communications industry. A number of research and development projects have been undertaken worldwide to define the next generation of Wireless Broadband Multimedia Communications Systems (WBMCS).

Industry discussion clearly indicates that continuous and future developments in high-bit rate services like Digital Video Transmission (DVT) or Wireless Local Area Networks (WLAN) will require the transmission of very high data rates over broadband radio channels. Space Division Multiple Access (SDMA) provides a possible solution to significantly increase the bandwidth efficiency and the transmission capacity of a cellular system or at least in a wireless network by exploiting the spatial dimension. The implementation of such SDMA receivers, however, requires accurate channel (response) estimation, also called channel transfer function, or multipath signal behavior, in severe frequency-selective and time-variant broadband radio channels. That is, the signal must be modeled at the receiver so that the receiver can understand and eliminate the multipath and co-channel interferences attendant with the signal transmission in order to reliably gather the data from the signal. The only way to accomplish the signal modeling is through the use of information in the signal which is known to both the transmitter and the receiver. This known information is contained within the "pilot sequence" (sequence of pilot symbols) of the signal. The reader is referred to a discussion of the problems of SDMA or other adaptive antennae array systems in U.S. Pat. No. 5,982,327 to Vook et al, and U.S. Pat. No. 6,141,393 to Thomas et al., which are herein incorporated by reference.

Thus, an important part of operating an adaptive antennae array such as in a Space Division Multiple Access (SDMA) wireless system is estimating the channel response of the mobile transmitting device, in order that multipath and co-channel interference may be adequately eliminated in order to accurately decode the information sent from the transmitting device. Obviously, speed and accuracy of computation of the channel response and efficiency of hardware usage are highly desirable in such a wireless system. The aforementioned Vook et al. and Thomas et al. patents have laid out plausible systems for the operation of multi-antenna systems. However, it is believed that certain further efficiencies may still be achieved in the operation of such systems in the realm of channel response estimation.

SUMMARY OF THE INVENTION

The present invention provides further efficiencies to the operation of a multi-antenna wireless communications system such as an Orthogonal Frequency Division Multiplex/Space Division Multiple Access (SDMA) wireless system using an adaptive antenna array.

Efficiency of channel response calculation, or "channel estimation", may be gained by aspects of the present invention, including:

1) A delay, or sequence shift, from the reference user is chosen for the pilot symbol transmissions of each user in the system and the delay is preferably always a multiple of the original Cyclic Prefix. A 3/2 multiple can be chosen to ensure proper performance through adequate symbol separation and to aid in the reduction of sinc functions. As is known, the Cyclic Prefix (CPx) is an additional sequence added to the beginning of a symbol (constructed from a predetermined number of samples taken from the other end of the symbol) to make sure that a symbol is longer than the maximum delay spread on a channel and is determined in advance for the transmission system.

2) Pilot symbols for the received data transmissions are used in the computation of channel responses by multiplying the pilot symbols by the conjugate of a selected (reference user's) Pilot symbol so that a Matched Filter Output is constructed for each method of channel response computation. After the Matched Filter Output is mathematically constructed from the pilot symbols the Matched Filter Output contains the desired channel response estimation. The channel response is then mathematically derived from the Matched Filter Output.

3) Each method of channel response computation, i.e., channel estimation, according to the present invention, i.e.: Iterative Low Complexity (ILC), Constrained Inverse Deconvolution (CID), and Extrapolated Matched Filter (EMF); is computationally more efficient than known systems because they do not require any matrix by matrix multiplications. Iterative Low Complexity and Constrained Inverse Deconvolution require only basis function computations (Fourier transforms) which the Extrapolated Matched Filter method requires only one matrix of reduced size ((N−K)X N) multiplied by one vector to estimate the channel response. Thus, not only is computation faster, hardware chosen for the system of the present invention need not utilize a separate block of hardware for the computationally expensive matrices calculations.

Thus, according to aspects of the invention the methods of channel estimation may include one or more of the following steps: selecting a pilot sequence delay for each mobile transmitter that is a greater than one multiple of the Cyclic Prefix delay; multiplying each received pilot sequence by the conjugate of the first mobile user pilot sequence to create a matched filter output; calculating each channel estimation using one or less matrix multiplications; calculating each channel estimation using only Fourier transforms; and calculating each channel estimation using a matrix and vector multiplication, including using a matrix that is a (N−K)X N matrix where K is the number of subcarriers and N is the number of time domain samples. The steps may be employed in a system which is an Orthogonal Frequency Division Multiple (OFDM)/Space Division Multiple Access (SDMA) system wherein the mobile transmitters use a Fourier transform to change the signal from a time domain to a frequency domain and the size of the Fourier transform for each mobile transmitter is N, not K, where N is the number of time domain samples, and K is the number of frequency domain symbols.

DETAILED DESCRIPTION OF THE PREFERRED EMBODIMENTS

The basic principle of OFDM transmission is to split a high-rate data stream into a number of lower rate streams that are transmitted simultaneously over a number of subcarriers. The first functional block of an OFDM transmitter is a Serial-to-Parallel (S/P) converter that converts the serial data, input at a rate of R symbols/second, to K parallel datastreams. Thus, the data rate for any of the K datastreams $(d_0, d_1, d_2, \ldots, d_k, \ldots, d_{K-1})$, is R/K symbols/second. The K outputs of the S/P converter are sent to an N-point Inverse Fast Fourier Transform (IFFT) functional block that operates on the K frequency-domain data symbols and converts them into N time-domain samples for transmission to the receiver.

As is known, to aid in removing the effects of channel transmission distortion at the receiver, a cyclic prefix (CPx) is pre-pended to the N point time domain samples to form the cyclically extended OFDM symbol. In general, the cyclic prefix length is chosen to encompass the maximum multi-path delay spread of the channel to prevent inter-symbol interference. Also, a cyclic prefix makes the OFDM symbol appear periodic over the time span of interest eliminating inter-carrier interference. With the CPx, the OFDM symbol and the channel appear to be cyclically convolved thereby facilitating channel equalization at the receiver.

Within the exemplary embodiment, a delay, or sequence shift, from the reference user is chosen for the pilot symbol transmissions of each user in the system and the delay is preferably always a greater than one multiple of the original Cyclic Prefix. A 3/2 multiple, as at equation (11), can be chosen to ensure proper performance through adequate symbol separation and to aid in the reduction of sinc functions.

To formulate the OFDM transmitter in equation form, the symbols are considered a data sequence $(d_0, d_1, d_2, \ldots, d_k, \ldots, d_{K-1})$, where each $d_k$ is a complex number $(d_k = a_k + j b_k)$. After performing an IFFT on the frequency domain data sequence, the result is a sampled time domain complex sequence $S_N = (S_0, S_1, S_2, \ldots, S_n, \ldots, S_{N-1})$, where $$S_n = \frac{1}{N} \sum_{k=0}^{N-1} d_k e^{j2\pi kn/N}, n = 0, 1, 2, \ldots, N-1 \qquad (1)$$

Figure 1:
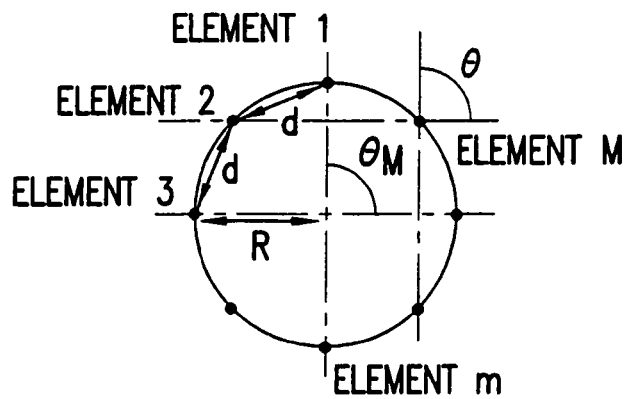
FIG. 1 depicts a circular adaptive antennae array (AAA) geometry utilized with aspects of the present invention.

The exemplary Antenna Array Model, or receiver mechanism, of the present invention utilizes a circular adaptive antennae array (AAA) geometry, as shown in FIG. 1, made up of multiple antenna elements. As is know, this type of antenna array has the ability to utilize the multiple antenna elements to steer beams through 360 degrees thereby giving complete coverage over the whole wireless cell area from a central receiver mechanism.

The M elements of the AAA are typically spaced a distance $d = \lambda/2$ apart, where $\lambda$ is the wavelength of the received signal. For an arbitrary number of antenna elements, M, the radius of the circular antenna array is known to be given by:

$$R = \frac{1}{4\sin(\pi/M)}. \qquad (2)$$

The position vectors of the elements (sensors) of the circular antenna array are the columns of the matrix:

$$P_M = \frac{R}{2} \begin{bmatrix} \cos(\phi_0) & \cos(\phi_1) & \ldots & \cos(\phi_m) & \ldots & \cos(\phi_{M-1}) \\ \sin(\phi_0) & \sin(\phi_1) & \ldots & \sin(\phi_m) & \ldots & \sin(\phi_{M-1}) \end{bmatrix}, \qquad (3)$$

where $\phi_m$ is the angle at which the $m^{th}$ antenna element is located with respect to the $\phi$ reference axis.

Also, the array pattern for an incidence angle, $\theta$, is known to be given by:

$$G(\theta) = \frac{1}{M} \sum_{m=0}^{M-1} w_m^* e^{-j\alpha^T P_m}, \qquad (4)$$

where $P_m$ is the $m^{th}$ column vector of the matrix $P_M$, $w_m$ is the $m^{th}$ antenna element complex weight, * denotes complex conjugate, and the slowness vector, $\alpha$, is defined as:

$$\alpha = \frac{2\pi}{\lambda} [\cos(\theta) \; \sin(\theta)]^T, \qquad (5)$$

where T denotes transpose in (4) and (5).

The Vector Channel Model of the present invention is the same as the one described in F. W. Vook, T. A. Thomas, and K. L. Baum, "*Least-Squares Multi-user Frequency-Domain Channel Estimation for Broadband Wireless Communica-* tion Systems," 37$^{th}$ Allerton Conference, Monticello, Ill., September 1999, where the baseband complex impulse response at the M element antenna array in a P multipath environment for each of the J SDMA users is expressed in the signal vector form as:

$$h_j(t) = \sum_{l=1}^{P} \gamma_{j,l} a_{j,l} \delta(t - \tau_{j,l}), \tag{6}$$

where $\gamma_{j,l}$ is the complex gain, $a_{j,l}$ is the (M×1) array manifold vector, and $\tau_{j,l}$ is the time of arrival for user j's $l^{th}$ multipath ray, or signal.

In OFDM, the frequency-domain representation of the channel is the sampled Fourier transform of (6), i.e.:

$$H_j(k) = \sum_{l=1}^{P} \gamma_{j,l} a_{j,l} e^{-j2\pi W(k-1-K/2)\tau_{j,l}/K}, \tag{7}$$

where W is the bandwidth of the K subcarriers, and N is the OFDM Fast Fourier Transform (FFT) size.

Each $H_j^m(k)$ denotes the complex baseband-equivalent channel gain between the $j^{th}$ user and the $m^{th}$ antenna on the AAA at the $k^{th}$ subcarrier.

Figure 2:
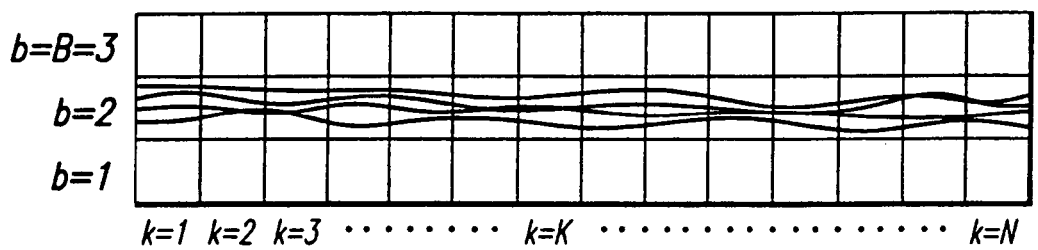
FIG. 2 depicts a Time-Frequency Slot example.

When using an AAA for equalization and interference suppression, or in SDMA applications where multiple transmitters may be using the same time and frequencies of transmission, the outputs of the inverse fast fourier transform (IFFT) of the transmitter can be arranged and stored in the receiver as blocks in buffers before, or while, processing. The common term for each of these blocks is a "Time-Frequency Slot," an example of which is shown in FIG. 2. Each of these time-frequency slots contains a pre-determined number of OFDM symbols that is determined by the signal processing algorithm utilized and other physical factors, e.g., the rate at which the channel changes, the required data rate, the number and location of pilot symbols inserted in each time-frequency slot, etc. For example, in FIG. 2, there are (B×N) total OFDM symbols in the time-frequency slot, consisting of B time instants (B=3 in the example) and N subcarrier frequencies. Pilot symbols are denoted in the b=2 portion of FIG. 2.

As is known, the received signals at each of the M antenna elements of the AAA are passed through an OFDM demodulator. The fast Fourier transform (FFT) in the OFDM demodulator of the receiver produces symbols which are the original data symbols multiplied by the baseband complex channel frequency response (CFR). The resulting symbols can be cascaded to form the received signal vector at each of K subcarriers, Y(k), that is:

$$Y(k) = \sum_{j=1}^{J} X_j(k) + N(k) = \sum_{j=1}^{J} H_j(k) s_j(k) + N(k), \tag{8}$$

where $X_j(k)$ is the $j^{th}$ users received complex baseband signal vector,

N(k) is a vector containing the complex noise on the M antenna elements at subcarrier k, and $H_j(k)$ is a vector that contains the complex channel gains between the $j^{th}$ user and each of the elements of the AAA.

The noise signals impinging on the AAA elements are assumed to be White Gaussian and have a correlation matrix $\Phi_N(k) = \sigma_n^2 I(k)$, where $\sigma_n^2$ is the estimated noise power on the array.

Then, the weight vector, or weight equation for user j on subcarrier k is known to be given by:

$$w_j(k) = \left\{ \sum_{i=1}^{J} H_i(k) H_i^H(k) + \sigma_n^2 I \right\}^{-1} H_j(k). \tag{9}$$

The term of equation (9) contained within the brackets may be considered a spatial covariance matrix defined as: $\Phi_j(k) = H_j(k) H_j(k)^H$, where H denotes complex conjugate transpose, (such as set forth in F. W. Vook, T. A. Thomas, and K. L. Baum, "Least-Squares Multi-user Frequency-Domain Channel Estimation for Broadband Wireless Communication Systems," 37$^{th}$ Allerton Conference, Monticello, Ill., September 1999.; F. W. Vook, "Adaptive Antennas for OFDM," *Vehicular Technology Conference*, May 1998.; C. A. Baird, and C. L. Zahm, "Performance Criteria for Narrowband Array Processing," *Conference on Decision Control*, Miami Beach, Fla., pp 564, December 1971.; and R. T. Compton Jr., *Adaptive Antennas: Concepts and Performance*, (Prentice-Hall, Englewood Cliffs, N.J.), 1988.) at symbol k for each of the SDMA users.

The problem then becomes to increase the calculation efficiency required to estimate the frequency-domain channel, $H_j(k)$, (j=1, 2, 3, . . . , J) as the FFT of L unknown (sample-spaced time-domain) channel tap gains, where L (the assumed length of the channel) is chosen to encompass the maximum expected multipath delay spread as shown in equation (10). The maximum multipath delay spread is assumed not to exceed the selected CPx of the OFDM symbol. For each of the J SDMA users, the frequency-domain model of the channel on each of the M antenna elements is given by:

$$H_{m,j}(k) = \sum_{n=0}^{L-1} h_{m,j}(n) e^{-j2\pi kn/N}, \tag{10}$$

where $h_{m,j}(n)$ is user j's channel tap weight on an antenna element m at a discrete time n.

In one aspect of the present invention a new approach for solving this estimation problem called the Iterative Low Complexity (ILC) estimation. The Iterative Low Complexity (ILC) algorithm, can be similar to the known Reduced Complexity (RC) estimation technique described below in efficiency, but with better performance equal to that of the known Least Squares (LS) technique described below.

The present invention in each case employs a set of pilot sequences similar to the ones used for the known Reduced Complexity method, but the delay of the pilot sequences for additional transmitters of the present invention from a reference transmitter is preferably a multiple of the CPx. Further, the FFT size used in the channel response estimation of the present invention is N (the number of time domain samples) and not K (the number of subcarrier frequencies) as in the Reduced Complexity method.

A preferred pilot sequence for the $j^{th}$ user is:

$$x_j(k, b_p) = b_T(k) e^{-j2\pi(j-1)k3/2CPx/N}, k=1, \ldots, K. \tag{11}$$

in order to incorporate the 3/2 multiple of the CPx for delay among the users' (tranmitters) pilot sequences. It will be appreciated that other greater than one multiples, or no multiple (unity), may be used for adjusting the CPx-based delay among the pilot sequences.

The received pilot symbols at each antenna element, $Y_m(k, b_p)$, are multiplied by the conjugate of the training symbols, $x_1^*(k, b_p)$, of the first, i.e., a selected, SDMA transmitter (i.e., j=1) for k=1, . . . , K, and zero elsewhere to form a Matched Filter Output, $G_m(k)$, at the $m^{th}$ antenna element, that is:

$$G_m(k) = \begin{cases} Y_m(k, b_p) \times x_1^*(k, b_p), k = 1, \ldots, K \\ 0, k = K+1, \ldots, N, \end{cases} \quad (12)$$

where, as before, the superscript * denotes complex conjugate.

In the noise free case, the Matched Filter output can be expressed as:

$$G_m(k) = x_1(k,b_p)x_1^*(k,b_p)H_1(k) + x_2(k,b_p)x_1^*(k,b_p)H_2(k) + \ldots + x_j(k,b_p)x_1^*(k,b_p)H_j(k), \quad (13a)$$

or equivalently:

$$G_m(k) = S_{11}(k,b_p)H_{m,1}(k) + S_{12}(k,b_p)H_{m,2}(k) + \ldots + S_{1J}(k,b_p)H_{m,J}(k), \quad (13b)$$

where $S_{11}(k, b_p)$ is the power spectral density of SDMA user 1 at pilot block $b_p$, $S_{1j}(k, b_p)$ is the cross power spectra between SDMA user 1 and the $j^{th}$ user, and $H_{m,j}(k)$ is the frequency domain Channel Impulse Response (CIR) between the $j^{th}$ user and the $m^{th}$ antenna element.

With the pilot symbols having the form of (11), consider two scenarios:

i) if K=N: then the Matched Filter output of (13-b) can be expressed in the (sampled) time domain as:

$$g_m(n) = \delta(n)*h_1(n) + \delta(n-3/2CPx)*h_2(n) + \ldots + \delta(n-(J-1)3/2CPx)*h_J(k) \quad (14)$$

where $\delta(n)$ is the discrete unit impulse sequence and * denotes convolution in equation (14). This is the same as the Reduced Complexity method with K=N; and ii) if K<N, which is typically the scenario in OFDM, then in the sampled-time domain, the correlation and the cross-correlation functions, by which the Matched Filter output is expressed, will have the form of unwanted sinc functions (i.e., $\sin(\pi n)/\pi n$), due to truncation of the pilot sequences in the frequency domain. Hence, the different users' channel impulse responses will suffer from aliasing between the sampled-time domain channel taps and partial overlap between any two adjacent SDMA users' channel impulse responses.

To remedy the truncation problem, the Matched Filter output is extrapolated by the Iterative Low Complexity function to make it look like the scenario where K=N. Then, the sampled-time domain Matched Filter output, $g_m(n)$, will contain the channels' sampled-time domain coefficients for all of the J SDMA users.

After every iteration, the extrapolation process is performed through the following operators:

In the frequency domain, $$G_m^{(i+1)}(k) = \begin{cases} G_m(k), & k = 1, \ldots, K. \\ G_m^{(i)}(k), & k = K+1, \ldots, N. \end{cases} \quad (15)$$

In the (sampled-)time domain, $$g_m^{(i+1)}(n) = \begin{cases} g_m^{(i)}(n), & n = (j-1)3/2CPx+1, \ldots, \\ & (j-1)3/2CPx+L; j = 1, \ldots, J \\ 0, & n = (j-1)3/2CPx+L+1, \ldots, \\ & j3/2CPx; j = 1, \ldots, J. \end{cases} \quad (16)$$

The Iterative Low Complexity process can be stopped after sufficient accuracy for the channel response is attained, e.g. about 10 iterations, without incurring additional computational cost. For J=3, N=512, K=448, M=8, and CPx=64, the ILC technique requires 427,520 complex multiplies for 10 iterations, which is a ratio of about 2:1 reduction from the known Least Squares method discussed below, with comparable accuracy.

In another aspect of the present invention a Constrained Inverse Deconvolution (CID) technique for the estimation of channel response (channel response) is set forth. Like the ILC method, the advantage of the CID method is that the iterations can be terminated after a relatively few number of iterations when the channel estimates for all SDMA users have attained enough accuracy but before there has been excessive amount of noise amplification. Another advantage enjoyed by iterative routines is that they can incorporate a priori knowledge about the nature of the channels to be estimated.

The basic iterative algorithm for estimating $H_m(k)$, from the matched filter output, $G_m(k)$, uses the method of successive approximations. The iteration is given in the sampled time domain by:

$$h_m^{(i+1)}(n) = \beta g_m(n) + [\delta(n) - \beta\alpha(n)] \otimes h_m^{(i)}(n), \quad (17)$$

then, the iteration in the frequency domain is given by:

$$H_m^{(i+1)}(k) = \beta G_m(k) + [1-\beta A(k)]H_m^{(i)}(k) \quad (18)$$

where convergence is guaranteed if $[1-\beta A(k)]<1 \forall k$.

Here, $H^{(i)}_m(k)$ is the frequency domain channel estimate after the $i^{th}$ iteration, $\beta$ is a relaxation parameter used to control the convergence rate, and where $\otimes$ denotes convolution. The initial estimate of the channels is $H^{(0)}_m(k) = \beta G_m(k)$.

A Van Cittert iterative method, (as set forth in D. E. Dudgeon and R. M. Mersereau, *Multidimensional Digital Signal Processing* Prentice-Hall, Englewood Cliffs, N.J., 1984.; and B. L. Johnson, D. W. Ricker, and J. R. Sacha, "The Use of Iterative Deconvolution for Scattering Function Identification," *The Journal of the Acoustical Soc. of America*, Vol. 91, Issue 5, pp. 2790-2798, May 1992.) is linear and may produce answers that violate the a priori knowledge about the channel impulse response such as the assumed length, which is not supposed to exceed the Cyclic Prefix (CPx) of the OFDM symbol. The present aspect of the invention incorporates the a priori knowledge about the length of the channel impulse response in the form of a constraint operator after each iteration, which results in a Constrained Iterative Deconvolution (CID) routine. The constraint is implemented in the sampled time domain as a signal support constraint:

$$C_{sup}[h_m^{(i+1)}(n)] = \begin{cases} h_m^{(i)}(n), & n = (j-1)3/2CPx+1, \ldots, \\ & (j-1)3/2CPx+L; j=1, \ldots, J \\ 0, & n = (j-1)3/2CPx+L+1, \ldots, \\ & j\, 3/2CPx; j=1, \ldots, J \end{cases} \quad (19)$$

Then, the sampled-time domain channel coefficients estimate for user j on antenna element m are entries [(j−1)3/2CPx+1] through [(j−1)3/2CPx+L] of $h_m(n)$. For J=3, N=512, K=448, M=8, and L=57, the CID technique requires 427,520 complex multiplies for 10 iterations, which is a ratio of about 2:1 reduction from that of the LS case set forth below.

In another aspect of the present invention herein called the Extrapolated Matched Filter (EMF) technique, again there is employed a set of pilot sequences similar to the ones used for the RC method, but with the time delay being always a multiple of the CPx and again, the FFT size is N, not K as in the RC method. The preferred pilot sequence for the $j^{th}$ user is again given by:

$$x_j(k,b_p) = b_T(k)e^{-i2\pi(j-1)k3/2CPx/N}, k=1, \ldots, K. \quad (11)$$

The received pilot symbols at each antenna element are multiplied by the conjugate of the training symbols of the first SDMA user (i.e., j=1) for k=1, ..., K and zero elsewhere to form what is called herein the Matched Filter (MF) output for user 1, $G_m(k)$, at the $m^{th}$ antenna element. Then, the vector, $G_m$, (of size N row×1 column) at each of the M antenna elements is extrapolated simply by a single matrix multiplication by an Extrapolation Matrix as set forth in M. S. Sabri, and W. Steenaart, "An Approach to Band-Limited Signal Extrapolation: The Extrapolation Matrix," *IEEE Transactions on Circuits and Systems*, VOL. CAS-25, NO. 2, February 1978, as:

$$G_m^+ = EG_m = [I-A]^{-1}G_m = [I-BWTW^{-1}]^{-1}G_m, \quad (20)$$

where:
E is the extrapolation matrix,
I is the identity matrix,
W is a N×N Discrete Fourier Transform (DFT) matrix,
T is a N×N diagonal matrix that limits the sampled time domain length of each user to L, expressed as:
T=diag{$T_1$, $T_2$, $T_3$, ..., $T_J$, 0, ..., 0}, where $T_j$ is a 3/2CPx X 1 vector expressed as: $T_j$=diag{$1^T_L$, 0, ..., 0} and $1^T_L$ is a L X 1 vector of ones; and
B is a N×N diagonal matrix that is expressed as diag{0, 0, 0, ..., $1^T$} where $1^T$ is (N−K)×1 vector of ones.

After taking the IFFT of $G^+_m$ to produce $g^+_m$, the (sampled) time domain channel estimates for user j on antenna element m are entries (j−1)3/2CPx+1 through (j−1) 3/2CPx+L of $g^+_m$.

It will be noted that after matrix E in equation (20) has been computed and stored, one only needs to multiply by a sub-matrix of E of size (N−K)X N to find the bottom (N−K) entries of $G^+_m$.

Least Squares Estimation

By way of comparison, a known technique called Least Squares Estimation (LS) (as set forth in the aforementioned F. W. Vook, T. A. Thomas, and, K. L. Baum, "Least-Squares Multi-user Frequency-Domain Channel Estimation for Broadband Wireless Communication Systems," $37^{th}$ Allerton Conference, Monticello, Ill., September 1999.) uses the time-frequency slot model of FIG. 2 and assumes that a sequence of known pilot symbols are transmitted at time block location, $b_p$, of the time-frequency slot. The estimate for the unknown channel time tap weights (CFRs) on the $m^{th}$ antenna element $h_{m,i}(n)$, is then found by solving a minimization problem by matching, in a Least Squares sense, the known transmitted pilot symbols to the received data. The problem is formulated as a matrix equation. However, the Least Squares channel estimation technique, while accurate, is relatively computationally expensive due to the matrices calculations; for example when J=3, N=512, K=448, M=8, and L=57 the Least Squares technique requires 743,424 complex multiplies.

Reduced Complexity Estimation

Also by way of comparison, a known simple multi-user channel estimation technique referred to as Reduced Complexity Estimation (RC), (also as set forth in the aforementioned F. W. Vook, T. A. Thomas, and K. L. Baum, "Least-Squares Multi-user Frequency-Domain Channel Estimation for Broadband Wireless Communication Systems," $37^{th}$ Allerton Conference, Monticello, Ill., September 1999.) works using a specific selection of the pilot training sequences. Reduced Complexity Estimation, while less computationally expensive than Least Squares Estimation, is not as accurate of an estimation. The basic idea of the Reduced Complexity Estimation channel estimation technique is to derive the training sequences of the synchronously active SDMA users from one basic sequence, thus reducing the problem of Multiple-Input Multiple-Output (MIMO) channel estimation to that of channel estimation in the single user case. First, a K-point IFFT is performed on the product of the received pilot symbols at each antenna element by the conjugate of the training symbols; that is, z=IFFT($\Psi \cdot B_T^*$), where Z is the (K×M) matrix of the time-domain channel estimates of the active SDMA users, $B_T^*$ is the (K×M) matrix of the conjugate of the first user pilot sequence, and the K-point FFT is performed column wise, where · means an element-by-element multiply. For example, user j's time-domain channel estimate on antenna element m is rows (j−1)L+1 through jL of column m of matrix Z. For J=3, N=512, K=448, M=8, and L=57, the Reduced Complexity (Reduced Complexity) technique requires 77,312 complex multiplies, which is a ratio of about 13:1 reduction from that of the Least Squares case.

Simulation Results

An OFDM/SDMA system was simulated for comparing each of the ILC, CID and EMF estimation techniques to both of the known RC and LS channel estimation techniques using MATLAB software available from The MathWorks of Natick, Mass. The channels were assumed constant over each time-frequency slot. The three SDMA users are located at (0°, 120°, −120°) from the reference positive x-axis. The following are the common simulation parameters: N=512 is the OFDM FFT size, K=448 is the number of frequency bins, CPx=64 is the Cyclic Prefix length, B=3 is the number of time blocks in each time-frequency slot, and J=3 is the number of simultaneous SDMA users. The circular antenna array has M=8 antenna elements. The additive noise at each of the M antenna elements is band-limited White Gaussian with power a $\sigma^2$. The actual multipath channel length is P=8, and L=10 is the assumed channel length.

Figure 3:
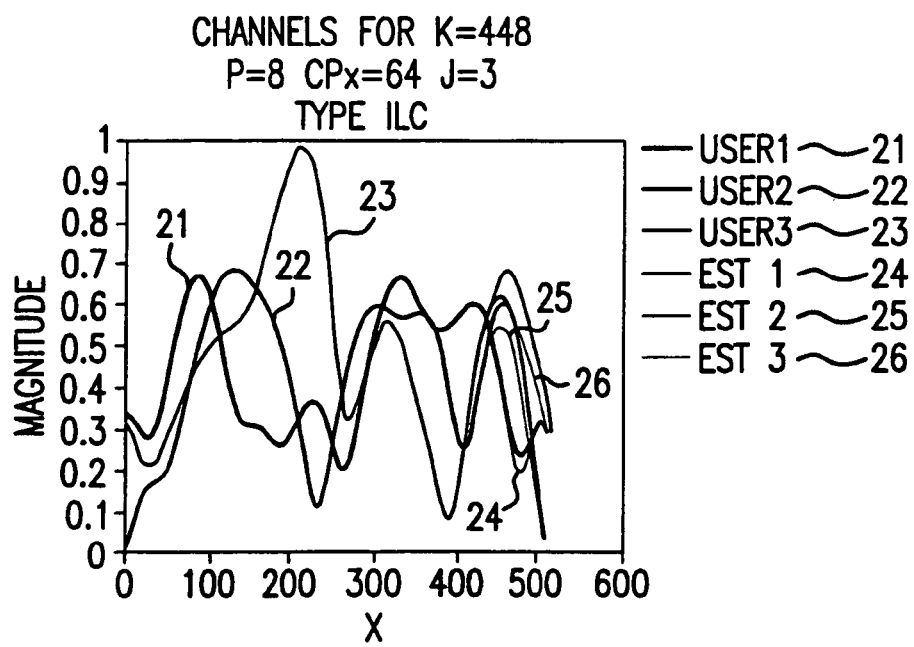
FIG. 3 depicts the frequency domain channels and their estimates at a Signal-to-Noise Ratio (SNR) of 10 dB for the three SDMA users on the reference antenna element of the AAA using the ILC method.
Figure 4:
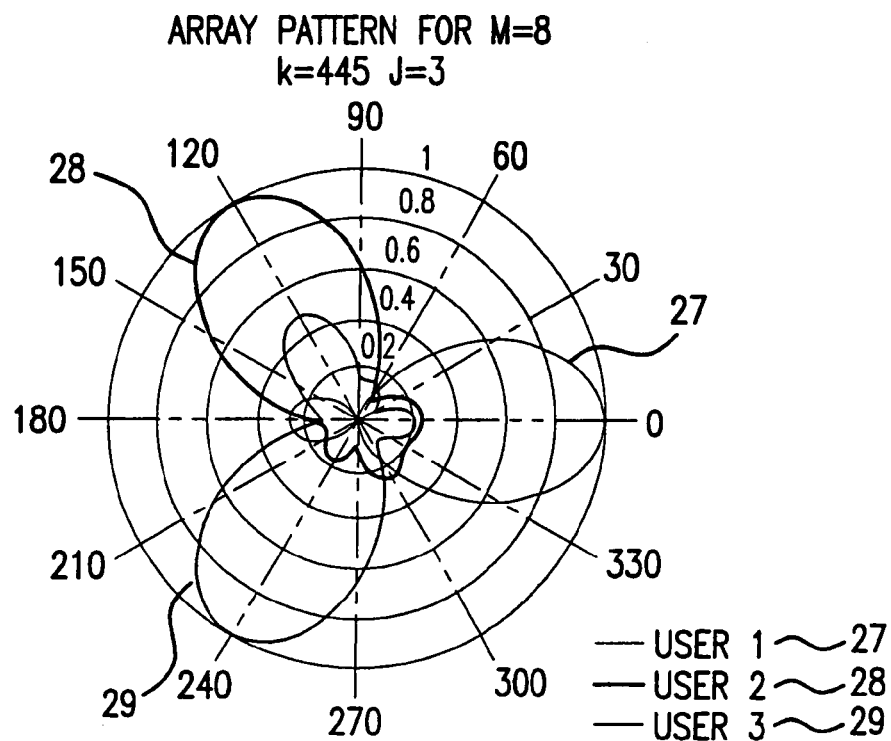
FIG. 4 depicts the effective antenna pattern at subcarrier k=445 for the Reduced Complexity method as constructed from the channel estimates using the weight equation (9).
Figure 5:
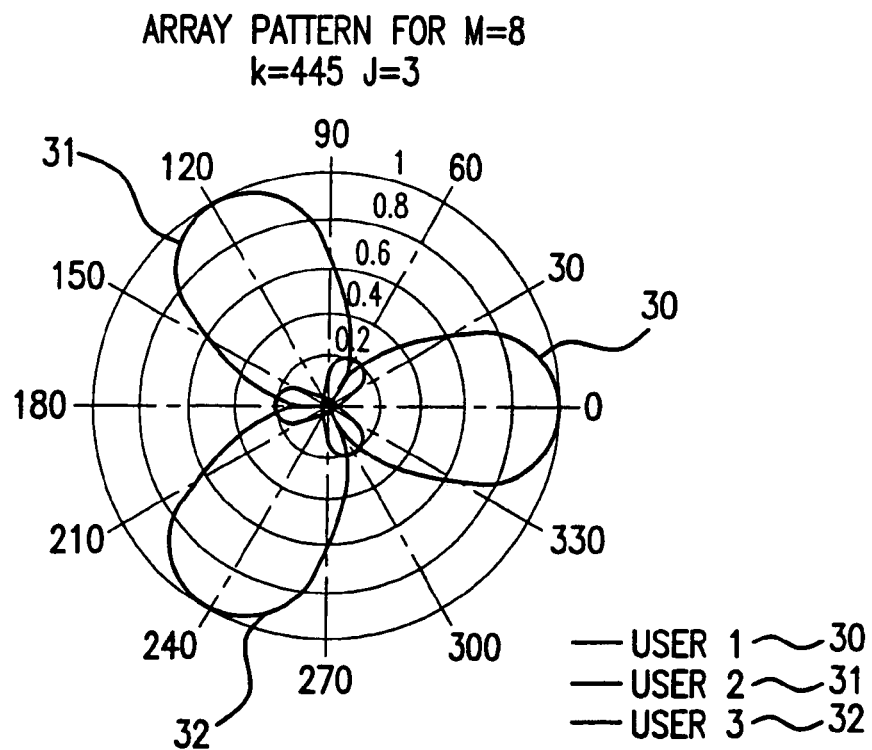
FIG. 5 depicts the effective antenna pattern for the ILC method as constructed from the channel estimates using the weight equation (9).

FIG. 3 depicts the frequency domain channels 21, 22, 23 and their estimates 24, 25, 26, respectively, at a Signal-to-Noise Ratio (SNR) of 10 dB for the three SDMA users on the reference antenna element of the AAA using the ILC method. The effective antenna patterns 27, 28, 29 at subcarrier k=445 are constructed from the channel estimates using the weight equation (9) and are depicted in FIG. 4 for the Reduced Complexity method and in FIG. 5 at reference numbers 30, 31, 32 for the ILC method, respectively. The effective antenna array pattern of the Reduced Complexity method depicted in FIG. 4 shows mutual contribution among three SDMA users instead of the desired nulls. This is due to less accurate channel estimates near the edges of the cell. In FIG. 5, it is clear that the adaptive array is capable of locating each SDMA user and forming a beam in that user's direction while simultaneously nulling any mutual contribution between users due to the more accurate channel estimates obtained by the ILC method.

Figure 6:
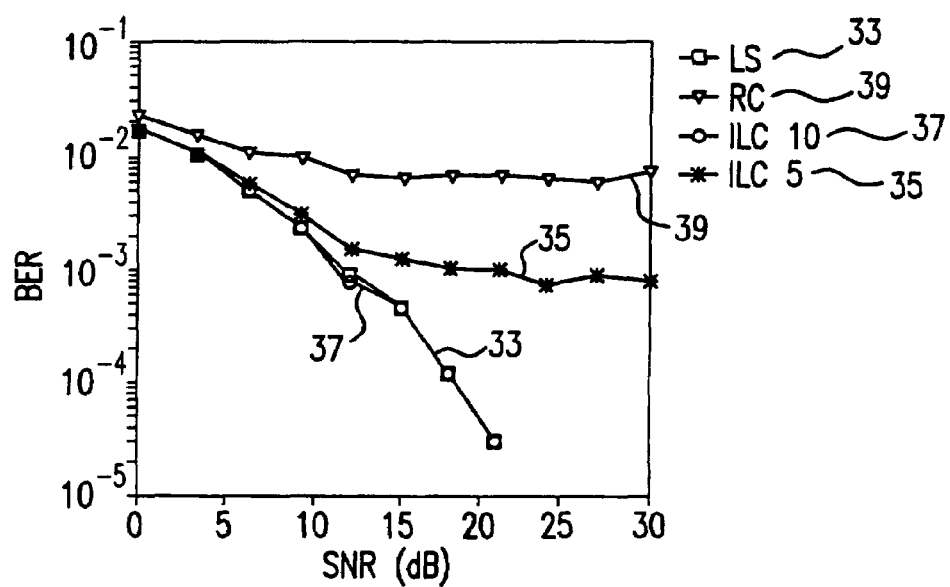
FIG. 6 depicts BER curves for the three different channel estimation schemes of the ILC technique, the Least Squares technique, and the Reduced Complexity technique.

In FIG. 6, BER (bit error rate) curves are shown for the three different channel estimation schemes with the same common system parameters. The Least Squares technique performs well for increasing SNR. The ILC technique approaches that of the Least Squares technique as the number of iteration increases. The BER for the ILC method is shown after both five iterations 35 and ten iterations 37. The BER curve for the ILC method overlaps with that of the Least Squares method after only ten iterations. Both the ILC and Least Squares methods significantly surpass the performance of the Reduced Complexity technique 39.

Figure 7:
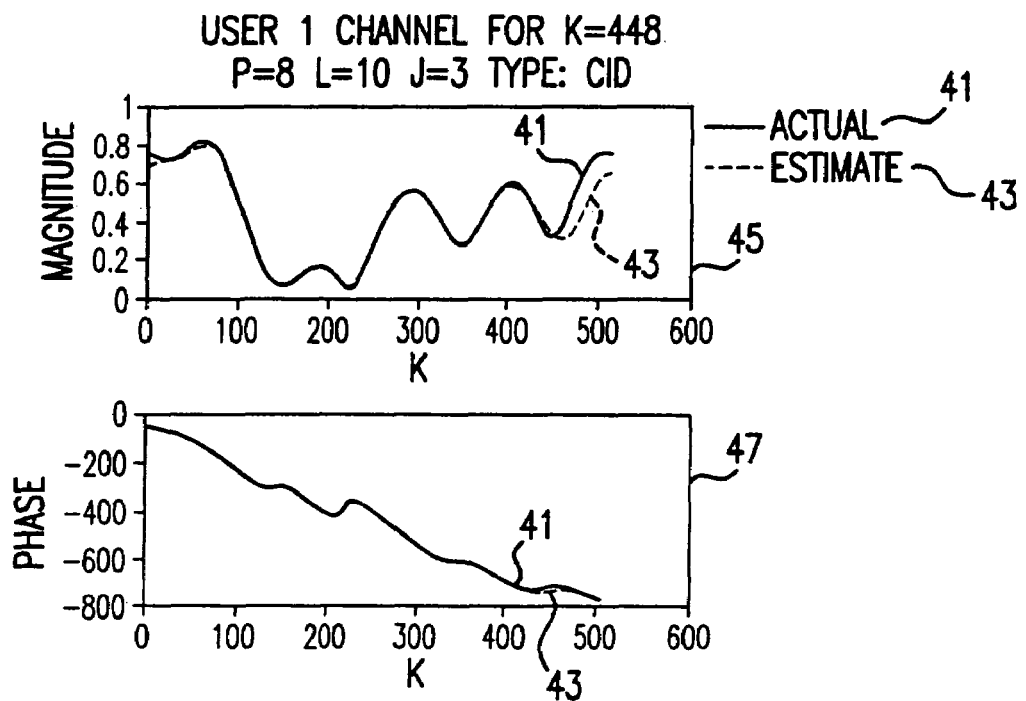
FIG. 7 depicts the frequency domain channel and its estimate obtained after ten iterations of the CID method.

FIG. 7 depicts the frequency domain channel 41 and its estimate 43 in magnitude and phase graphs 45, 47, respectively, obtained after only ten iterations of the CID method using $\beta=0.8$ for SDMA user 1 at the reference antenna element of the AAA at a Signal-to-Noise Ratio (SNR) of 10 dB. The effective antenna patterns 51, 53 were constructed from the channel estimates using the weight equation (9) and are depicted in FIG. 8 and FIG. 9 for the CID and the RC methods, respectively.

Figure 8:
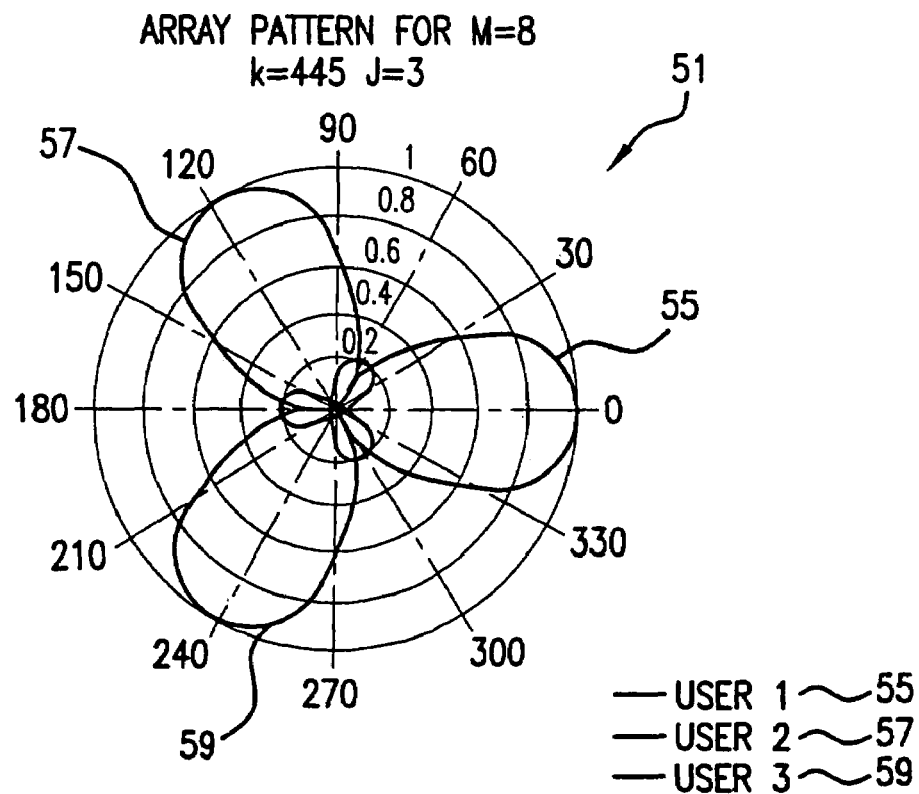
FIG. 8 depicts the effective antenna pattern for the CID method as constructed from the channel estimates using the weight equation (9).

As shown in FIG. 8, with the CID method the adaptive antenna array is capable of locating each SDMA user 55, 57, 59 and forming a beam in that user's direction while simultaneously nulling any mutual contribution between users when the channel estimates are allowed to be accurate. When using the RC method, as depicted in FIG. 9, the resulting antenna array pattern shows mutual contribution among the three SDMA users 55, 57, 59 instead of the desired nulls due to less accurate channel estimates near the edges of the cell. FIG. 10 shows the BER curves for CID, LS, 33 and RC 39 channel estimation schemes with the same common system parameters. The LS technique performs well for increasing SNR. The BER curve for the CID technique can lie anywhere between that of the RC technique and that of the LS technique depending on the number of iterations, and is shown after both five iterations 61 and ten iterations 63. The BER for the CID method overlaps that of the LS technique after only ten iterations. The performance of both the CID and the LS techniques can surpass that of the RC method. However, the CID method can have less computational complexity than that of the LS technique with an equal performance.

Figure 9:
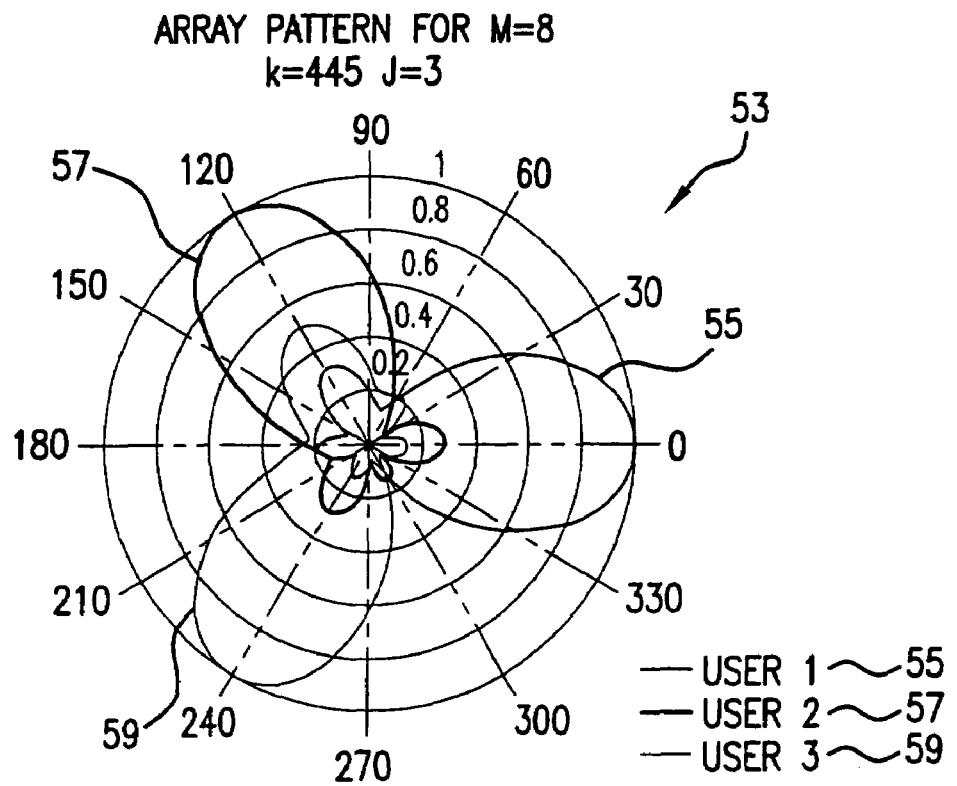
FIG. 9 depicts the effective antenna pattern for a known Reduced Complexity method as constructed from the channel estimates using the weight equation (9).
Figure 10:
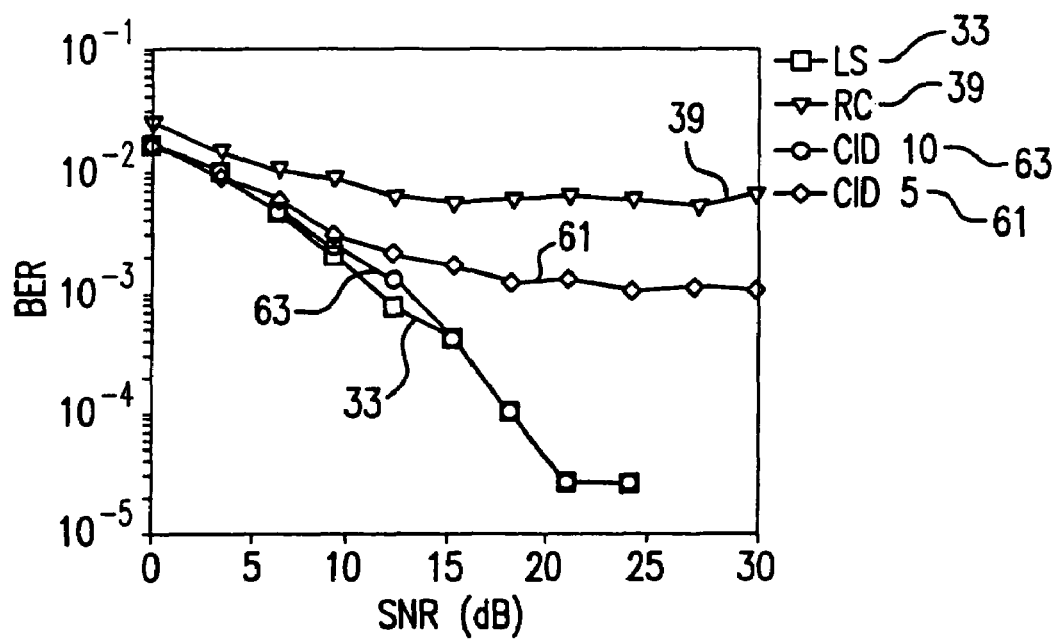
FIG. 10 depicts the BER curves for Constrained Inverse Deconvolution, and known Least Squares and Reduced Complexity channel estimation schemes with the same common system parameters.
Figure 11:
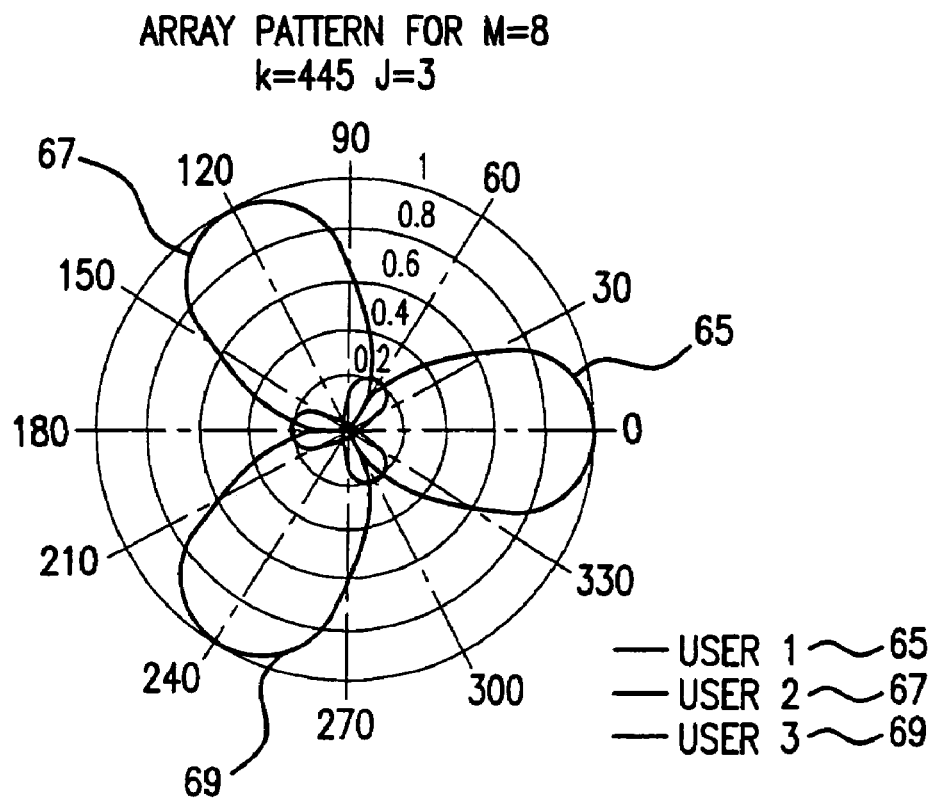
FIG. 11 depicts the effective antenna pattern for the Extrapolated Matched Filter method as constructed from the channel estimates using the weight equation (9).
Figure 12:
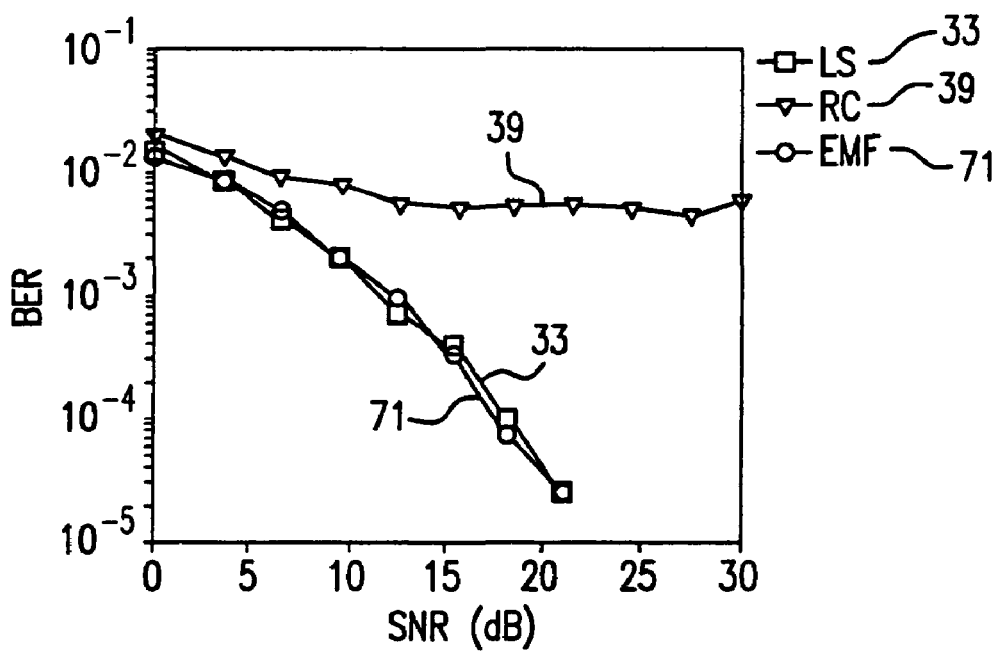
FIG. 12 depicts the BER curves for Extrapolated Matched Filter, Reduced Complexity and Least Squares channel estimation schemes with the same common system parameters.

FIG. 9 and FIG. 11 depict the effective antenna patterns for the RC and the EMF techniques, respectively, at subcarrier k=445 as constructed from the channel estimates using the weight equation (9). The Signal-to-Noise Ratio (SNR) was set at 10 dB for three SDMA users on a reference antenna element of the AAA. As shown in FIG. 11, the EMF method allows the adaptive array to locate each SDMA user 65, 67, 69 and form a beam in that user's direction while simultaneously nulling any mutual contribution between users when the channel estimates are allowed to become more accurate. The RC estimation method antenna array pattern of FIG. 9 shows mutual contribution among the SDMA users due to less accurate channel estimates near the edges of the cell. FIG. 12 shows the BER curves for EMF 71, RC 39, and LS 33 channel estimation schemes with the same common system parameters. The EMF technique has a performance similar to that of the LS technique with a computational complexity similar to that of the RC method.

The person having ordinary skill in the art will appreciate that there has been described an exemplary embodiment. It will recognized that many of the functionalities described herein can be accomplished by a variety of hardware, firmware and software methods and apparatus within the scope of the present invention. Having thus described the present invention, it will be appreciated that many variations thereon will occur to the artisan upon an understanding of the present invention, which is therefore to be limited only by the appended claims.

I claim:

1. A method of channel estimation for a multi-user broadband wireless transmission system having a multiple antenna receiver system for the transmission of signals from mobile transmitters and the reception of the signals at the multiple antenna receiver, comprising:
   each of the mobile transmitters changing the signals from a time domain to a frequency domain using a Fourier transform and a size of the Fourier transform for each mobile transmitter is N, not K, where N is a number of time domain samples, and K is a number of frequency domain symbols;
   receiving a pilot sequence from a first mobile user;
   introducing a pilot sequence delay into a pilot sequence of at least one further mobile user;
   receiving the pilot sequence including the pilot sequence delay from the at least one further mobile user;
   multiplying each received pilot sequence from the at least one further mobile user by a conjugate of the first mobile user pilot sequence to create a matched filter output; and
   calculating the channel estimation for the transmission of signals from mobile transmitters using the matched filter output.

2. The method of claim 1, further comprising:
   calculating the channel estimation for each received transmission using a matrix multiplication of not more than one.

3. The method of claim 1, further comprising:
   calculating each channel estimation using only Fourier transforms.

4. The method of claim 1, further comprising:
   calculating each channel estimation using a matrix and vector multiplication.

5. The method of claim 4, wherein:
   the matrix is a (N–K)X N matrix where K is a number of subcarriers, N is a number of time domain samples, and $K \leq N$.

6. The method of claim 1, wherein:
   the system is an Orthogonal Frequency Division Multiple (OFDM)/Space Division Multiple Access (SDMA) system.

7. The method of claim 3, further comprising:
   calculating the channel estimation by an Iterative Low Complexity method.

8. The method of claim 3, further comprising:
   calculating the channel estimation by a Constrained Inverse Deconvolution (CID) method.

9. The method of claim 4, further comprising:
   calculating the channel estimation by an Extrapolated Matched Filter method.

10. A method of sending a plurality of signal transmissions from mobile transmitters to a receiver in a multi-user wireless transmission system, the method comprising:
receiving a pilot symbol sequence from a first mobile user;
receiving a further pilot symbol sequence from at least one further mobile user, wherein the further pilot symbol sequence is expressed as:

$$x_j(k,b_p)=b_T(k)e^{-i2\pi(j-1)k3/2CPx/N}, k=1,\ldots,K;$$

where $x_j$ is a jth user pilot sequence,
k is a subcarrier number,
$b_p$ is a time instance in a time-frequency slot where the pilot symbols are transmitted,
$b_T$ is a reference user pilot sequence (constant modulus sequence), and $$e^{-i2\pi(j-1)k3/2CPx/N}$$

is a phase shift factor to incorporate a shift of 3/2CPx among different transmitter pilot sequences; and
multiplying each further pilot symbol sequence from the at least one further mobile user by a conjugate of the first mobile user pilot sequence to create a matched filter output.

11. A method of sending a plurality of signal transmissions from mobile transmitters to a receiver in a multi-user wireless transmission system, the method comprising:
receiving a pilot symbol sequence from a first mobile user;
receiving a further pilot symbol sequence from at least one further mobile user, wherein the further pilot symbol sequence is expressed as:

$$x_j(k,b_p)=b_T(k)e^{i2\pi(j-1)kACPx/N}, k=1,\ldots,K;$$

where $x_j$ is a jth user pilot sequence,
k is a subcarrier number,
$b_p$ is a time instance in a time-frequency slot where the pilot symbols are transmitted,
$b_T$ is a reference user pilot sequence (constant modulus sequence), and $$e^{i2\pi(j-1)kCPx/N}$$

is a phase shift factor to incorporate a shift of A X CPx among different transmitter pilot sequences, where A is a number greater than 1; and
multiplying each further pilot symbol sequence from the at least one further mobile user by a conjugate of the first mobile user pilot sequence to create a matched filter output.

12. A method of sending a plurality of signal transmissions from mobile transmitters and to a receiver in a multi-user wireless transmission system, the method comprising:
splitting a data stream of each of the plurality of signal transmissions into a plurality of lower rate streams each including data symbols and pilot symbols;
converting the lower rate streams to N-point time domain samples;
adding a first Cyclic Prefix (CPx) to the N-point time domain samples for a first of the plurality of signal transmissions to provide a first plurality of cyclically extending symbols;
selecting a pilot sequence delay for a second of the plurality of signal transmissions, wherein the delay is a greater than one multiple of the first Cyclic Prefix;
adding a second Cyclic Prefix (CPx) to the N-point time domain samples for the second of the plurality of signal transmissions to provide a second plurality of cyclically extending symbols, the second Cyclic Prefix including the delay;
receiving at the receiver the first plurality of cyclically extending symbols and the second plurality of cyclically extending symbols of the other of the plurality of signal transmissions; and
multiplying the pilot symbols of the second plurality of cyclically extending symbols by a conjugate of the first Cyclic Prefix to obtain a matched filter output.

13. The method of claim 12, wherein the matched filter output is used to estimate channels in the multi-user wireless transmission system.

14. The method of claim 12, further comprising:
calculating a channel estimation for each of the plurality of signal transmissions using a matrix multiplication of not more than one.

15. The method of claim 12, further comprising:
calculating a channel estimation for each of the plurality of signal transmissions using only Fourier transforms.

16. The method of claim 12, further comprising:
calculating a channel estimation for each of the plurality of signal transmissions using a matrix and vector multiplication.

17. The method of ef claim 16, wherein:
the matrix is a (N−K)X N matrix where K is a number of subcarriers, N is a number of time domain samples, and K≦N.

18. The method of claim 12, wherein:
the system is an Orthogonal Frequency Division Multiple (OFDM)/Space Division Multiple Access (SDMA) system.

19. The method of claim 12, wherein:
the mobile transmitters use a Fourier transform to change the lower rate streams from a time domain to a frequency domain and a size of the Fourier transform for each mobile transmitter is N, not K, where N is a number of time domain samples, and K is a number of frequency domain symbols.

20. The method of claim 14, further comprising:
calculating the channel estimation by an Iterative Low Complexity method.

21. The method of claim 14, further comprising:
calculating the channel estimation by a Constrained Inverse Deconvolution (CID) method.

22. The method of claim 16, further comprising:
calculating the channel estimation by an Extrapolated Matched Filter method.

* * * * *